US009696765B2

United States Patent
Senatori et al.

(10) Patent No.: US 9,696,765 B2
(45) Date of Patent: Jul. 4, 2017

(54) DOUBLE-TRACK GUIDED HINGE

(71) Applicant: HEWLETT-PACKARD DEVELOPMENT COMPANY, L.P., Houston, TX (US)

(72) Inventors: Mark Senatori, Houston, TX (US); Hong Insun, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/021,433

(22) PCT Filed: Oct. 30, 2013

(86) PCT No.: PCT/US2013/067393
§ 371 (c)(1),
(2) Date: Mar. 11, 2016

(87) PCT Pub. No.: WO2015/065348
PCT Pub. Date: May 7, 2015

(65) Prior Publication Data
US 2016/0299538 A1    Oct. 13, 2016

(51) Int. Cl.
*G06F 1/16*    (2006.01)

(52) U.S. Cl.
CPC .......... *G06F 1/1681* (2013.01); *G06F 1/1616* (2013.01); *G06F 1/1632* (2013.01)

(58) Field of Classification Search
CPC combination set(s) only.
See application file for complete search history.

(56) References Cited

U.S. PATENT DOCUMENTS

| | | | |
|---|---|---|---|
| 6,771,494 B2 | 8/2004 | Shimano | |
| 7,187,538 B2 | 3/2007 | Homer | |
| 7,685,680 B2* | 3/2010 | Chien | G06F 1/1622 16/239 |
| 8,108,017 B2* | 1/2012 | Jang | G06F 1/1616 348/14.07 |
| 8,264,829 B2 | 9/2012 | Moser | |

(Continued)

FOREIGN PATENT DOCUMENTS

| | | | |
|---|---|---|---|
| KR | 10-2013-0020031 | 2/2013 | |
| WO | WO 2015065348 A1 * | 5/2015 | ........... G06F 1/1616 |

OTHER PUBLICATIONS

Islam, "Hybrid Laptops with Touch Screens and Detachable Keyboards Soon Will Flood the Market", http://www.bdplay.com/technology-world/hybrid-laptops-with-touch-screens-and-.

(Continued)

*Primary Examiner* — Lisa Lea Edmonds
(74) *Attorney, Agent, or Firm* — HP Patent Department (57) ABSTRACT

In one example, a double-track guided hinge for an electronic device. The hinge includes a bent lever arm having an arm pin adjacent one end, an arm pivot, and a curved slot adjacent the other end, the curved slot extending towards the arm pivot. The hinge also includes an angled slot slidably engaged with the arm pin. The hinge further includes a rotatable connector block having a block pivot and a pin radially offset from the block pivot, the offset pin slidably engaged with the curved slot A carrier moveably attached to the lever arm at the arm pivot and to the connector block at the block pivot, is linearly moveable responsive to rotation of the pivot connector block.

15 Claims, 6 Drawing Sheets

(56) References Cited

U.S. PATENT DOCUMENTS

| | | | | | |
|---|---|---|---|---|---|
| 8,300,394 | B2* | 10/2012 | Senatori | ............... | G06F 1/1616 16/358 |
| 8,374,658 | B2* | 2/2013 | Laido | ............... | G06F 1/1616 379/428.01 |
| 8,619,415 | B1* | 12/2013 | Lam | ............... | G06F 1/1616 248/917 |
| 8,713,757 | B2* | 5/2014 | Chen | ............... | G06F 1/1616 16/327 |
| 8,749,965 | B1* | 6/2014 | Lam | ............... | G06F 1/1616 248/918 |
| 8,787,010 | B2* | 7/2014 | Arima | ............... | G06F 1/1681 361/679.06 |
| 9,021,658 | B1* | 5/2015 | Yang | ............... | G06F 1/1681 16/366 |
| 9,304,553 | B2* | 4/2016 | Park | ............... | G06F 1/1681 |
| 2006/0007644 | A1* | 1/2006 | Huilgol | ............... | G06F 1/1616 361/679.07 |
| 2010/0041448 | A1* | 2/2010 | Gaddy | ............... | G06F 1/1616 455/575.3 |
| 2010/0103601 | A1* | 4/2010 | Wang | ............... | E05D 3/18 361/679.02 |
| 2011/0304983 | A1 | 12/2011 | Senatori | | |
| 2012/0162888 | A1* | 6/2012 | Arima | ............... | G06F 1/1616 361/679.08 |
| 2012/0162926 | A1* | 6/2012 | Duan | ............... | G06F 1/1681 361/727 |
| 2012/0170186 | A1* | 7/2012 | Wu | ............... | G06F 1/1624 361/679.01 |
| 2012/0262857 | A1 | 10/2012 | Fukaya | | |
| 2013/0021762 | A1 | 1/2013 | Van Dijk et al. | | |

OTHER PUBLICATIONS

MD. Zashidul Islam, Hybrid Laptops with Touch Screens and Detachable Keyboards Soon Will Flood the Market, BDPlay.com, Apr. 20, 2013.

* cited by examiner

DOUBLE-TRACK GUIDED HINGE

BACKGROUND

Many electronic devices such as, for example, notebook computers, DVD players, cell phones, and the like, employ clamshell-like arrangement in which a hinge mechanism connects two housings. For example, one housing may include a display, while the other housing may include a keyboard. The hinge mechanism may be disposed adjacent to one edge of the housings. In a closed orientation, the two housings may be substantially stacked one on top of the other with, for example, the display and the keyboard facing each other in the interior of the stack. In an open orientation, the two housings may be angled with respect to each other such that, for example, the display and the keyboard are accessible by a user of the device.

DETAILED DESCRIPTION

As noted in the Background section, many electronic devices use a clamshell-like arrangement of two housings connected by a hinge mechanism. A number of considerations including size, center of gravity, and appearance, may affect the placement of the hinge mechanism in the device. Many electronic devices, for example notebook computers, are operated with one of the housings (usually a base portion that includes the keyboard) laid flat on a surface, and the other housing (usually a display portion) positioned at an angle greater than 90 degrees from the base portion. The further towards the adjacent rear edge of the device the hinge mechanism is positioned, the greater the depth occupied by the open device. In limited spaces, such as for example in an airline seat, it may not be possible to open the device far enough to position the display at a usable angle. In addition, if the base portion is made thinner and lighter, and thus with more of the mass of the device distributed to the display unit, the center of gravity of the opened device may shift far enough behind the rear of the base unit so as to make the device unstable, or even topple over, when open.

As a result, in some electronic devices the hinge mechanism may be placed further forward in the base unit, further away from the rear edge of the base portion. This can reduce both the depth occupied by and the rearward shift in the center of gravity of, the open device. However, if the display unit keeps the same size, such a technique would add depth to the base unit, which disadvantageously increases the size of the electronic device when closed. In addition, to accommodate the thickness of the display unit as it is rotated into position, a large clearance cut would be made in the top surface of the base, behind the opened display, in order to allow for the rotation of the display unit. Such a clearance cut visually mars the top surface of the device in the closed orientation, which can adversely affect customer perception and demand in the case of consumer products.

Referring now to the drawings, there is illustrated an example of a double-track guided hinge mechanism constructed in accordance with the present disclosure. As defined herein and in the appended claims, a "double-track guided hinge mechanism" shall be broadly understood to mean a hinge mechanism whose motion during operation of the hinge is primarily guided or determined by the structure of two tracks of the hinge mechanism.

The hinge mechanism may be disposed in a nest of the base housing of an electronic device at a position adjacent the rear of the base housing. As the display housing of the device is rotated up from the closed orientation into the open orientation, the hinge mechanism is displaced linearly out of the nest and forward towards the front edge of the base housing. As a result of the forward displacement, the center of gravity of the open device is also moved toward the front of the base housing, thus advantageously increasing stability of the open device without adding otherwise unneeded depth to the base housing. In addition, the forward displacement of the hinge mechanism allows the display housing to be rotated into position without a clearance cut in the top surface, thus advantageously providing clean lines and an unmarred appearance to the top surface of the electronic device in the closed orientation. Since the linear forward displacement of the hinge during operation occurs without significant upward displacement of the hinge, the electronic device can advantageously be thinner in height since the housings need not be thick enough to accommodate significant upward displacement.

Considering now one example of an electronic device having a double-track guided hinge mechanism, and with further reference to FIGS. 1A-C, 2A-B, and 3, one example electronic device 10 has a first base housing (a "base portion", "base unit", or "base") 20 and a second display housing (a "display portion", "display unit", or "display") 30. The base unit 20 has a top surface 22 and a nest in an elevated portion 24 that is raised above the top surface 22 by a distance. The height of the elevated portion 24 may accommodate larger I/O connectors, indicated generally at 14, of the device 10. The distance may be substantially equal to the thickness 32 of the display unit 30, at least at a bottom edge 34 of the display unit 30 ("bottom" when the display unit 30 is in the open orientation). The display unit 30 is positionable against the top surface and the nest in the closed orientation of the device 10 (FIGS. 1A, 2A) to form a substantially continuous upper outer surface 12 of the device 10.

In one example, the display unit 30 is permanently attached to the base 20 by a hinge mechanism 40, such as in a notebook computer configuration. In this configuration, the base unit 20 includes a keyboard (or keypad) 26 and/or a touchpad 27, a battery (not shown), and the majority of the device electronics (not shown), while the display unit 30 includes the display device 36, such as, for example a flat-screen display. In another example, the display unit 30 may be detached from the hinge mechanism 40, which remains in the base 20. When detached, the display 30 unit may be used independently of and apart from the base 20 as a slate or tablet computer. In this configuration, the base unit 20 includes the keyboard 26, while the display unit 30 includes the majority of the device electronics (not shown), along with the display device 36. The hinge mechanism 40 is disposed adjacent a rear portion 16 of the electronic device 10. The rear portion 16 is opposite a front portion 17 of the electronic device 10.

In one example, the electronic device 10 includes at least two double-track guided hinge mechanisms 40a, 40b, spaced apart along a width of the device 10. The hinge mechanisms 40 are within the device 10 and shown in dashed lines. Each hinge mechanism 40 is attached to the base unit 20 and the display unit 30. The hinge mechanism 40 has a first position in the closed orientation (FIGS. 1A and 2A) of the device 10. The first position is within the nest in the elevated portion 24. The hinge mechanism 40 also has a second position when the display unit 30 is rotated in the open orientation (FIGS. 1C and 2B) of the device 10. The second position outside the nest and displaced linearly from the first position. The second position may be linearly displaced in a direction along an axis substantially parallel to the top surface 22. The term "substantially" accounts for any slight downward tilt in the top surface 22 from the back to the front of the device 10 for ergonomic or other reasons. The second position may also be linearly displaced from the first position in a direction along an axis parallel to the bottom outer surface 28 of the base 20. The nest, and the hinge mechanism positions, will be discussed subsequently in greater detail with regard to FIGS. 4A-4B and 5A-5B, and the operation and linear displacement of the hinge will be discussed subsequently in greater detail with regard to FIGS. 7A-7B, 8A-8B, and 9A-9B.

The substantially continuous upper outer surface 12 results from the lack of a clearance cut in the top surface 12 of the device 20 to accommodate the rotation of the hinge. If a clearance cut were to exist, it would be located in the elevated portion 24 of the base 20, in the position indicated by dashed lines 18. However, the linear forward displacement of the hinge mechanism 40 in the direction 42 as the device 10 is opened allows the display unit 30 to be rotated up into the open position without such a clearance cut 18. The distance of linear forward displacement of the hinge mechanism 40 in the direction 42 equals at least the thickness 32 of the bottom edge 34 of the display unit 30.

Figure 4A:
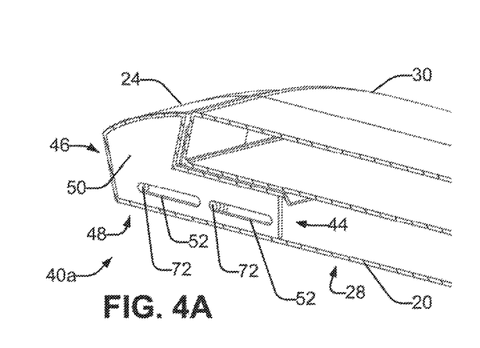
FIGS. 4A and 4B are partial cutaway schematic perspective views of an electronic device in closed and open orientations, the views showing a first side of a double-track guided hinge mechanism in accordance with an example of the present disclosure.
Figure 4B:
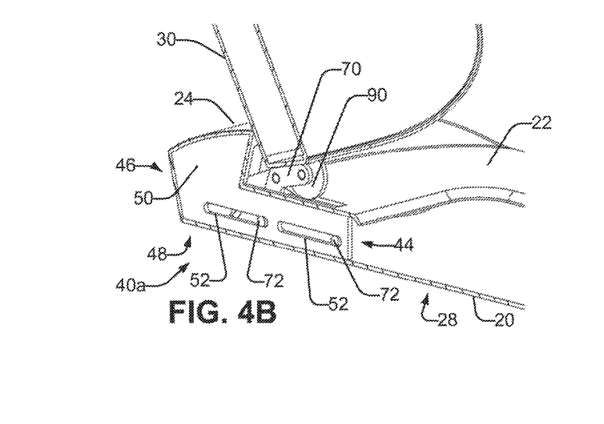

Considering now one example of the hinge mechanism 40 in greater detail, and with reference to the partial cutaway schematic perspective views of the electronic device of FIGS. 4A-4B and 5A-5B, two sides of the hinge mechanism 40a in the electronic device 10 are illustrated. As illustrated in FIGS. 4A-4B, the device 10 is viewed in the direction 45 and cutaway at the plane of the left side of the hinge 40a, while in FIGS. 5A-5B, the device 10 is viewed in the direction 46 and cutaway at the plane of the right side of the hinge 40a. In addition, various components of the device 10 such as the keyboard, touchpad, display, etc. are omitted for clarity of illustration. All of the hinges 40 are disposed in the electronic device 10 such that the front 44 of the hinge mechanism 40 faces the front 17 of the electronic device and the rear 46 of the hinge mechanism 40 faces the rear 16 of the electronic device 10.

Figure 5A:
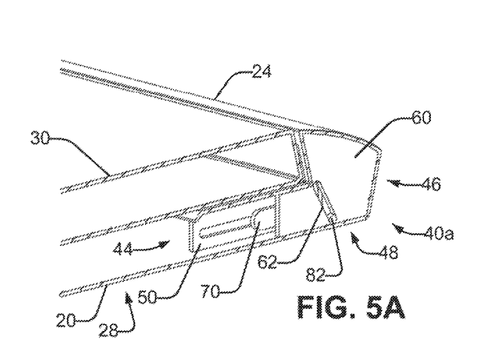
FIGS. 5A and 5B are partial cutaway schematic perspective views of an electronic device in closed and open orientations, the views showing a second, opposite side of the double-track guided hinge mechanism of FIGS. 4A and 4B respectively in accordance with an example of the present disclosure.
Figure 5B:
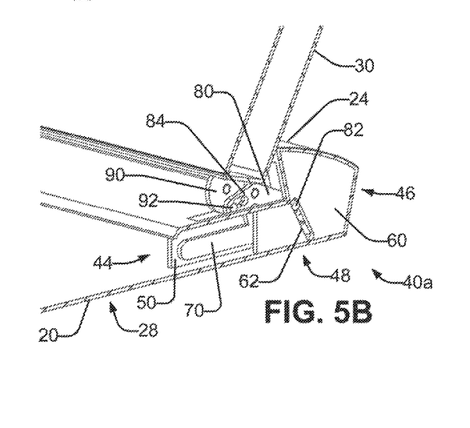

The left side of the hinge 40a is formed by a carrier bracket 50, and the right side of the hinge 40 is formed by a lever arm bracket 80. The brackets 50, 60 are fastened or fixedly mounted to the base 20, and spaced apart to define the nest as will be discussed subsequently in greater detail with reference to FIGS. 6A-6B. A carrier 70, a lever arm 80, and a connector block 90 of the hinge 40a are movable during opening and closing of the device 10. When the device is in the closed position (i.e. FIGS. 4A, 5A), these elements 70, 80, 90 are positioned within the nest (i.e. they are not visible in FIGS. 4A, 5A as they are covered by brackets 50, 60. When the device is in the open position (i.e., FIGS. 4B, 5B), these elements 70, 80, 90 are linearly translated to a position that is at least partially outside of the nest (i.e. at least a portion of elements 70, 80, 90 are visible). The additional features of these elements 70, 80, 90 which are illustrated in FIGS. 5A-5B will also be discussed subsequently in greater detail with reference to FIGS. 6A-5B.

Figure 1A:
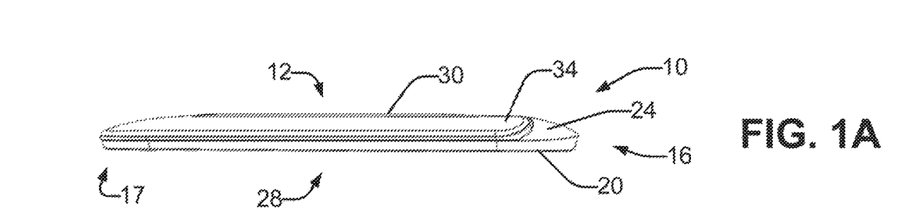
FIGS. 1A through 1C are schematic perspective views of an electronic device including a double-track guided hinge mechanism in closed, partially open, and open orientations respectively in accordance with an example of the present disclosure.
Figures 1B, 1C:
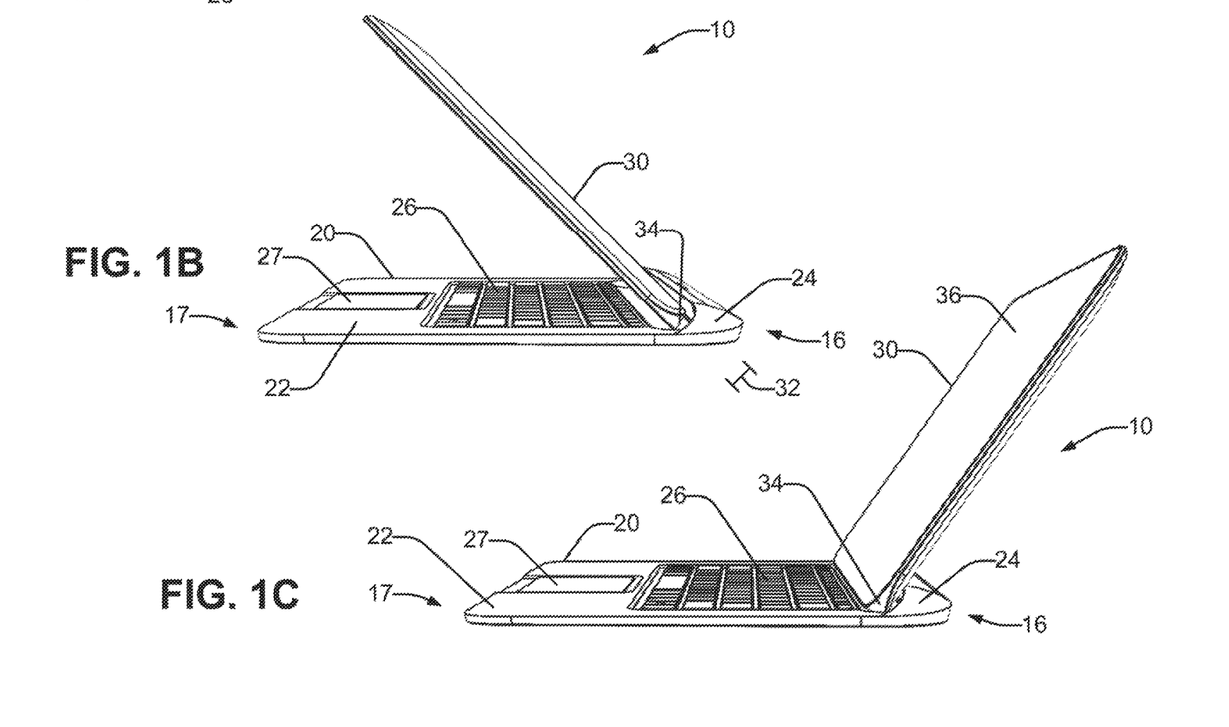
Figures 2A, 2B, 3:
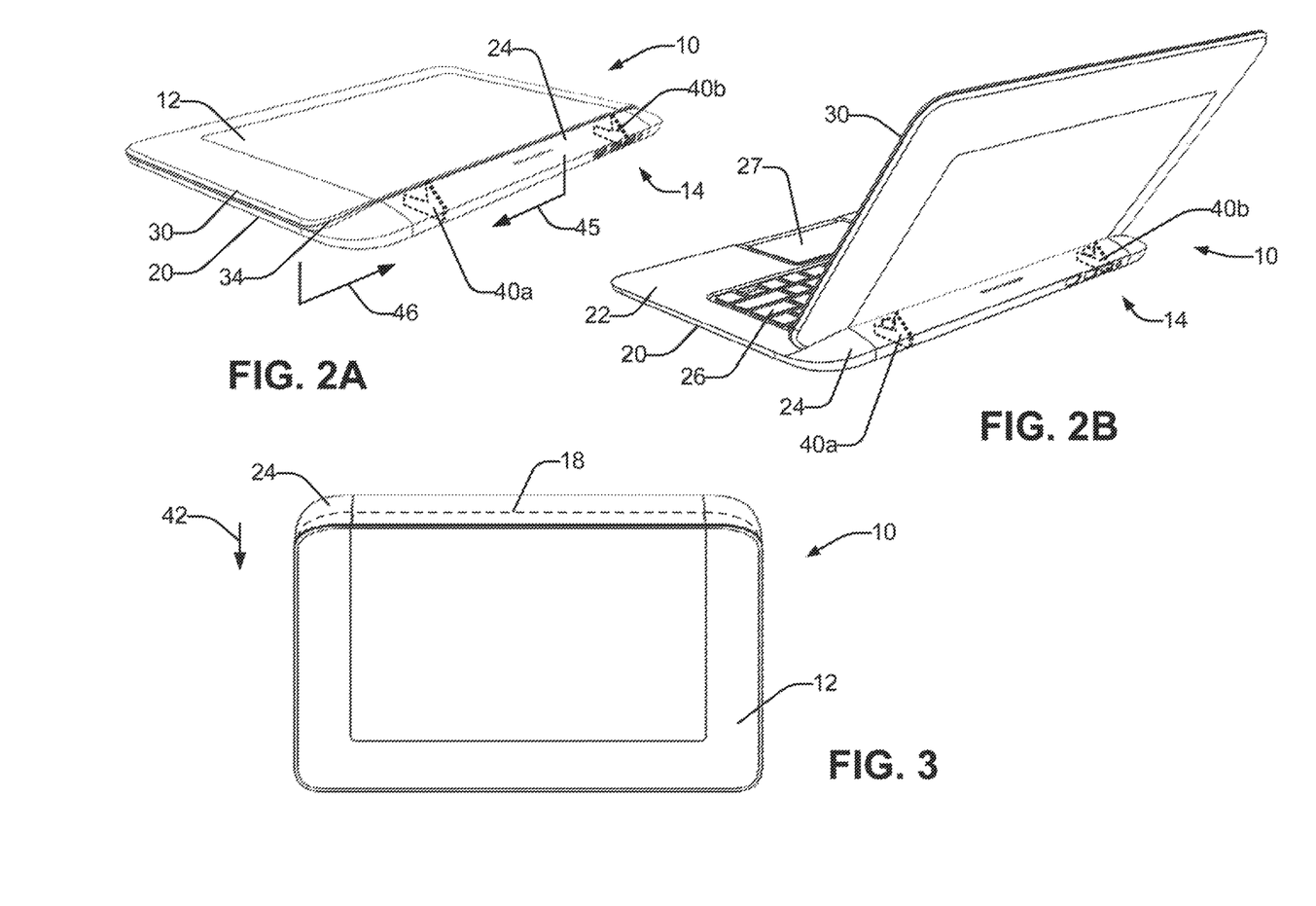
FIGS. 2A and 2B are other schematic perspective views of an electronic device including a double-track guided hinge mechanism in closed and open orientations respectively in accordance with an example of the present disclosure.
FIG. 3 is a schematic top view of an electronic device including a double-track guided hinge mechanism in a closed orientation in accordance with an example of the present disclosure.
Figure 6A:
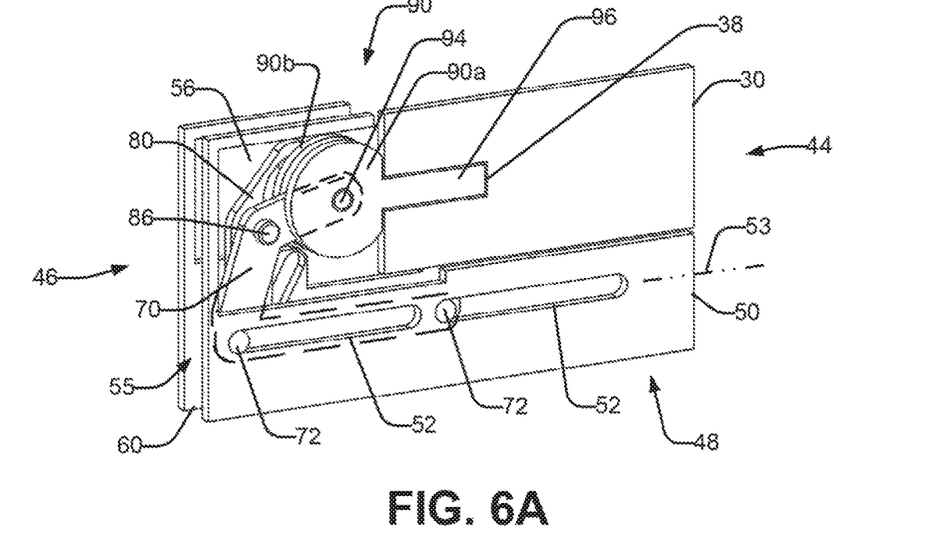
FIGS. 6A and 6B are schematic perspective views of a simplified and cutaway double-track guided hinge mechanism connected to a portion of a display unit of an electronic device in accordance with an example of the present disclosure.
Figure 6B:
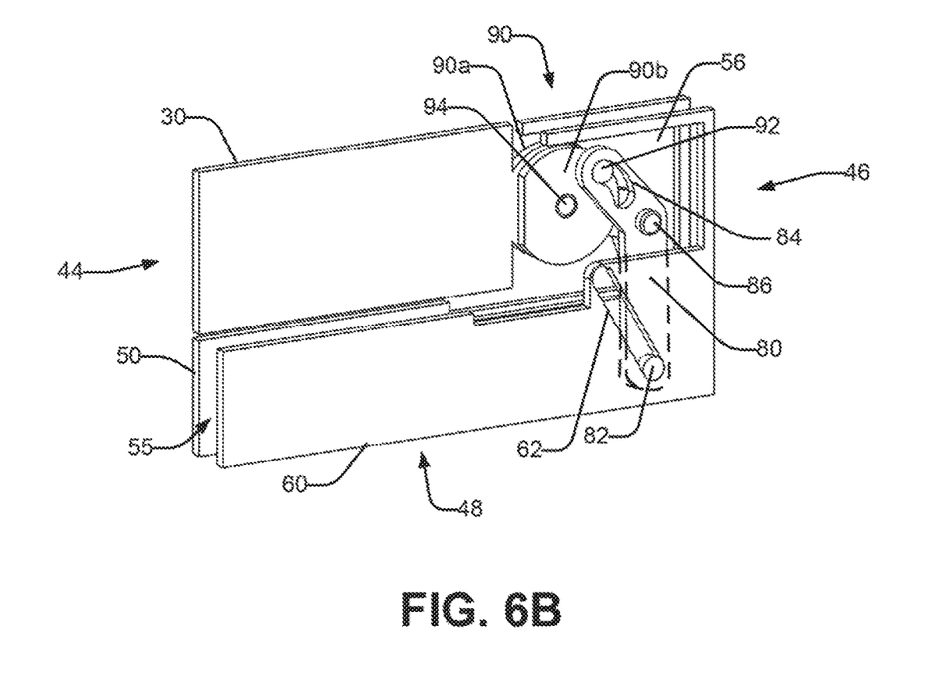

Considering now the structure of one example of the double-track guided hinge mechanism 40 in greater detail, and with reference to the schematic simplified perspective views of FIGS. 6A-6B, the hinge mechanism 40 may be either the hinge 40a or the hinge 40b (FIGS. 2A-2B). A portion of each bracket 50, 60 has been further cutaway in order to more clearly illustrate additional features of the carrier 70, lever arm 80, and connector block 90 of the hinge 40 when these elements are inside a nest 55 as well as outside the nest 55. In addition, the hidden portions of carrier 70 in FIG. 6A and lever arm 80 in FIG. 6B (but not other elements) are illustrated in dashed lines to more clearly indicate their structure and features. Furthermore, display unit 30 as shown for clarity as just a "slice" instead of at its full width, so as not to obscure the other components.

The nest 55 is defined as the volume between the carrier bracket 50 and the lever arm bracket 60. The planes of brackets 50, 60, are disposed generally parallel to each other and spaced apart, and both brackets 50, 60 have substantially the same shape and outline. In one example, the spacing between the brackets 50, 60 may range from 100 to 400 millimeters. It is noted that the nest 55 includes the rectangular void 56 which corresponds to the portions of brackets 50, 60 which are cutaway in the simplified view of FIGS. 6A-6B.

The lever arm 80 is bent or angled at a central portion. The lever arm 80 includes an arm pivot 86 which, in one example, is disposed at the central portion. The arm pivot 86 defines a point about which the lever arm 80 can rotate, and may be implemented in the lever arm 80 as a hole in the lever arm 80 through which a shaft is inserted to allow the lever arm 80 to rotate on the shaft. The lever arm 80 has an arm guide pin 82 disposed adjacent the end of a lower leg of the lever arm 80, and a curved slot 84 adjacent an end of an upper leg of the lever arm 80. The curved slot 84 extends lengthwise along the upper leg of the lever arm 80. The ends of the curved slot 84 are disposed along a central axis of the upper leg, and the curved slot 84 is bowed outward towards one side of the upper leg. The curved slot 84 is further configured to slidably and rotatably engage a pin that can run along the length of the curved slot 84. The curved slot 84 is one of the two tracks which primarily guide or determine the motion of the hinge mechanism 40 during operation. Relative to a straight slot, the curved slot 84 increases the forward movement of the lever arm 80 with rotation of the connector block 90. It makes the lever arm 80 translate forward proportionately more at the portion of the curved slot 84 near the end of the upper leg of the lever arm 80 in order to get the connector block 90 out from within the nest 55. In other words, the ratio of the amount of forward movement of the lever arm for a given amount of rotation of the connector block 90 is increased with the curved slot 84, relative to an alternative straight slot.

The arm guide pin 82 of the lever arm 80 slidably and rotatably engages as an angled guide slot 62 in the lever arm bracket 60. The angled guide slot 62 linearly extends from the bottom rear of the bracket 60 upwards and towards the front 44 of the hinge mechanism 40. The term "angled", as used here and in the appended claims in reference to the angled guide slot 62, refers to the upward and forward linear extension of the angled guide slot 62, as compared to a non-angled linear slot having upward extension but no forward extension. Angling the guide slot 62 towards the front 44 of the hinge mechanism 40, as will be discussed subsequently in greater detail with reference to FIGS. 7A-7B, 8A-8B, and 9A-9B, adds additional forward movement that moves the hinge mechanism 40 proportionately more towards the front 44 of the hinge 40 as the lever arm 80 is rotated by the positioning of the device 10 from the closed to the open orientation. In other words, the ratio of the amount of forward movement of the hinge mechanism for a given amount of rotation of the connector block 90 is increased with the angled guide slot 62, relative to an alternative vertical guide slot. The angled guide slot 62 is the other of the two tracks which primarily guide or determine the motion of the hinge mechanism 40 during operation.

The carrier bracket 50 includes a bottom portion having two carrier guide slots 52 disposed linearly along the same axis 53. The axis is substantially parallel to the bottom edge 48 of the hinge mechanism 40, which in turn is substantially parallel to the plane of the bottom outer surface 28 of the device 10. Each carrier guide slot 52 slidable engages a carrier guide pin 72 on the carrier 70. The arrangement of the two slots 52 constrains the carrier 70 to linear movement in a direction along this axis 53 as the device 10 is moved from the closed to the open orientation. Thus the axis 52 defines the direction of translational movement of the carrier 70, lever arm 80, and connector block 90 as the device 10 is moved from the closed to the open orientation. In an alternative example (not shown), the carrier may use a rod slidably engaged with a mating cylinder in place of the carrier guide pins 72 and guide slots 52 to similarly constrain the carrier 70 to linear movement in a direction along the axis of the rod and cylinder as the device 10 is moved from the closed to the open orientation.

The connector block 90 has a block pivot 94 and an offset pin 92 that is radially offset from the block pivot 94. The block pivot 94 defines a point about which the connector block 90 can rotate, and may be implemented in the connector block 90 as a hole in the connector block 90 through which a shaft is inserted to allow the connector block 90 to rotate on the shaft. The connector block 90 also has a protruding alignment tab 96. The alignment tab 96 is complementary to a mating alignment receptacle 38 of a display unit 30, and connectable to the receptacle 38. In one example, the display unit 30 is permanently attached to the base 20 via the alignment tab 96 and the alignment receptacle 38. In another example, where the display unit 30 can function as a standalone tablet or slate computer, the display unit 30 is removably attached to the base 20 via the alignment tab 96 and the alignment receptacle 38. The alignment tab 96 and the alignment receptacle 38 may include mating electrical connection mechanisms between the base unit 20 and the display unit 30. These connections allow the base unit 20 and the display unit 30 to be communicatively coupled to each other.

The carrier 70 is linearly translatable but non-rotatable with respect to the brackets 50, 60. The carrier 70 is moveably attached to the lever arm 80 at the arm pivot 86, and attached to the connector block 90 at the block pivot 94. The carrier 70 includes a hole at a bend in an arm portion of the carrier 70 through which a shaft for the arm pivot 86 passes, thus connecting the carrier 70 to the lever arm 80 at the position of the arm pivot 86. The carrier 70 also includes a hole at an upper end of the arm portion of the carrier 70 through which a shaft for the block pivot 94 passes, thus connecting the carrier 70 to the connector block 90 at the block pivot 94. The carrier 70 moves linearly along the axis 53 responsive to rotation of the connector block 90 as will be discussed subsequently in greater detail with reference to FIGS. 7A-7B, 8A-8B, and 9A-9B.

In one example, the connector block 90 includes a D-shaped docking connector block 90a having the alignment tab 96, and a D-shaped pivot connector block 90b having the offset pin 92. The flat portions of the D shape of blocks 90a, 90b are aligned with each other. The pivot connector block 90b and the docking connector block 90a are fixedly connected to each other and rotatably engaged with the carrier 70. In one example, a shaft at the block pivot 94 fixedly connects the pivot connector block 90b, the docking connector block 90a, and the carrier 70. In one example, the carrier 70 may be positioned between the blocks 90a, 90b or the shaft at the block pivot 94. The alignment tab 96 may be attached to either or both of the D-shaped connector blocks 90a, 90b. The offset pin 92 of the connector block 90 slidably and rotatably engages the curved slot 84 of the lever slot 80.

In another example, the hinge 40 may be a mirror image of that illustrated in FIGS. 6A-6B. In other words, instead of the carrier bracket 50 being on the left and the lever arm bracket 60 on the right of the hinge 40 when viewed from the front 44, their positions (and) may be mirror imaged such that the carrier bracket 50 is on the right and the lever arm bracket 60 on the left. In such an arrangement, the left-to-right positions of the other components of the hinge 40 will similarly be mirror imaged. In another example, the two hinges 40a, 40b of the electronic device 10 may be mirror images of each other. This can be useful in mechanically linking the two hinges 40a, 40b together such that the alignment tabs 96 of both hinges 40a, 40b are rotatably synchronized, which can facilitate removal and reattachment of a removable display unit 30. In one such configuration, a single central shaft may connect the two docking connector blocks 90*a* of two hinges 40*a*, 40*b*, or a single docking connector block 90 may span both hinges 40*a*, 40*b*.

The hinge 40 also is structured to provide a static coefficient of friction to be overcome in order to rotate the hinge mechanism 40. This coefficient is sufficient to account for, among other factors, the weight of the display unit 30. By providing sufficient friction, the display unit 30 can be set in any of a variety of angular positions up to fully open and remain in place. This friction may be established between one or more of the sets of moving elements of the hinge 40*a*, such as between the carrier guide slots 52 and guide pins 72, the connector block 90 and the carrier 70, the lever arm 80 and the carrier 70, or the like.

The various parts of the hinge 40 may be made of metal or plastic. The thickness of the individual parts may range from 0.5 millimeter to several millimeters.

Figure 7A:
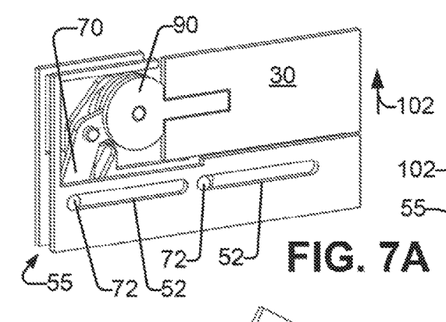
FIGS. 7A and 7B are schematic perspective views of the operation of the simplified double-track guided hinge mechanism of FIGS. 6A and 6B in a closed orientation in accordance with an example of the present disclosure.
Figure 7B:
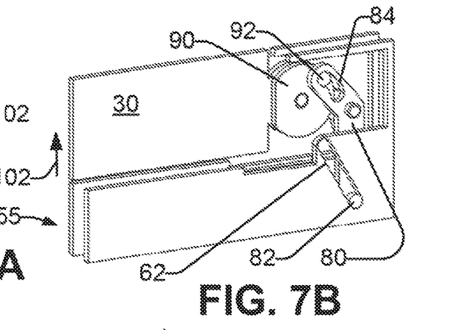
Figure 8A:
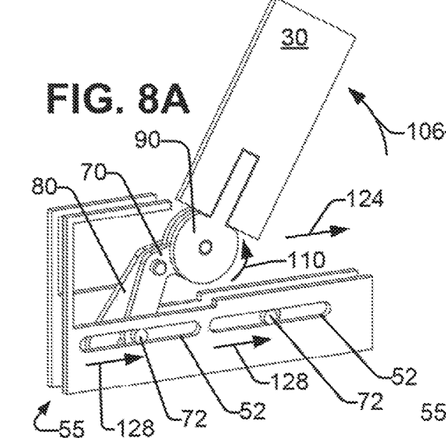
FIGS. 8A and 8B are schematic perspective views of the operation of the simplified double-track guided hinge mechanism of FIGS. 6A and 6B in a partially open orientation in accordance with an example of the present disclosure.
Figure 8B:
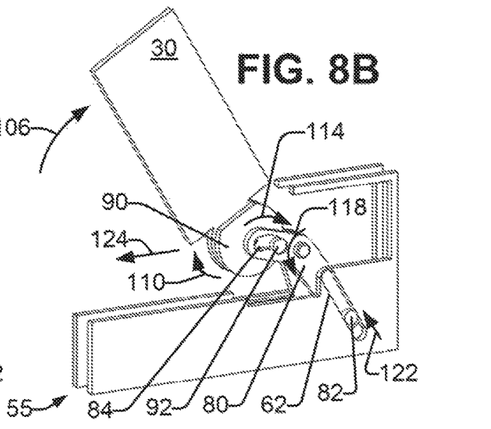
Figure 9A:
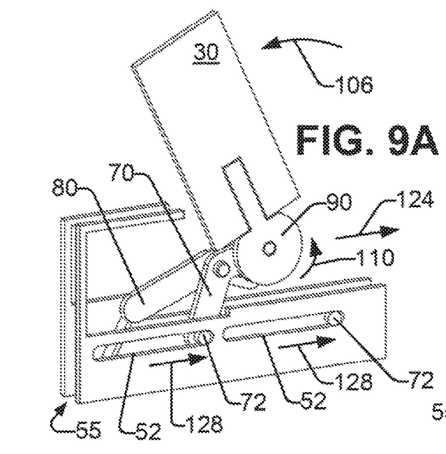
FIGS. 9A and 9B are schematic perspective views of the operation of the simplified double-track guided hinge mechanism of FIGS. 6A and 6B in an open orientation in accordance with an example of the present disclosure.
Figure 9B:
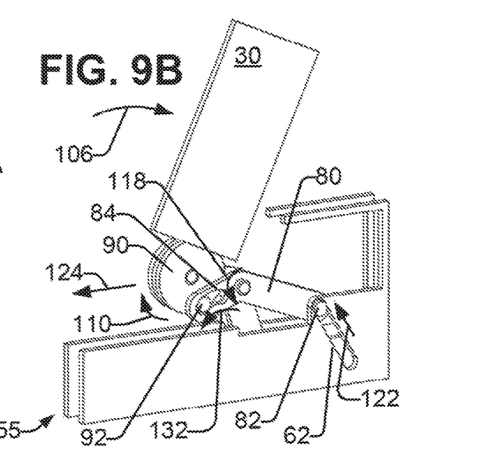

Considering now the operation of one example of the double-track guided hinge mechanism 40 of FIGS. 6A-6B in greater detail, and with reference to the schematic simplified perspective views of FIGS. 7A-7B, 8A-8B, and 9A-9B, a left side view of the hinge mechanism 40 is shown for closed, partially open, and fully open positions in FIGS. 7A, 8A, and 9A respectively, and a right side view of the hinge mechanism 40 is shown for closed, partially open, and fully open positions in FIGS. 7B, 8B, and 9B respectively. Taken together, these drawings illustrate operation of setting the example hinge mechanism 40 from a closed orientation into an open orientation.

In the closed orientation, force is exerted on the display unit 30 in an upward direction 102 in order to start lifting the display unit 30 up towards an open position. This causes the display unit 30 to rotate in the direction 106, and the connector block 90 (i.e. docking connector block 90*a* and pivot connector block 90*b*) to rotate in the same direction 110. As the connector block 90 rotates to a partly open orientation, the offset pin 92 on the connector block 90 runs along the curved slot 84 on the lever arm 80 in the direction 114 causing the lever arm 80 to rotate in the direction 118. As the lever arm 80 rotates in the direction 118, the angled guide pin 82 at the opposite end of the lever arm 80 runs upward and forward in the direction 122 along the angled guide slot 62. This motion causes the connector block 90, the lever arm 80, and the carrier 70 to move (translate) linearly forward in the direction 124, as constrained by the linear forward motion 128 of the carrier guide pins 72 in the carrier guide slots 52. As the connector block 90 continues to rotate to the fully open orientation, the offset pin 92 runs along the curved slot 84 on the lever arm 80 in the direction 132, opposite to the direction 114, while the angled guide pin 82, the carrier guide pins 72, the connector block 90, the lever arm 80, and the carrier 70 each continue to move in the same respective direction as before. The linear forward motion of the connector block 90, the lever arm 80, and the carrier 70 allows the display unit 30 to clear the nest 55 that houses them in the closed orientation, and the elevated portion 24 of the base unit 20 (FIGS. 4A-4B, 5A-5B), as the display unit 30 rotates up to the fully open orientation. The linear forward motion also has the effect of moving the center of gravity of the rotated display unit 30 closer to a center of the surface of the base unit 20, which increases stability of the electronic device 10 in the open position.

In order to set the example hinge mechanism 40 from the open orientation into an closed orientation, force can be exerted on the display unit 30 to cause it to rotate in the opposite direction of direction 106. The translation and rotation of the various components of the hinge mechanism 40 will then occur in the directions opposite from the directions 110-128 respectively.

Figure 10:
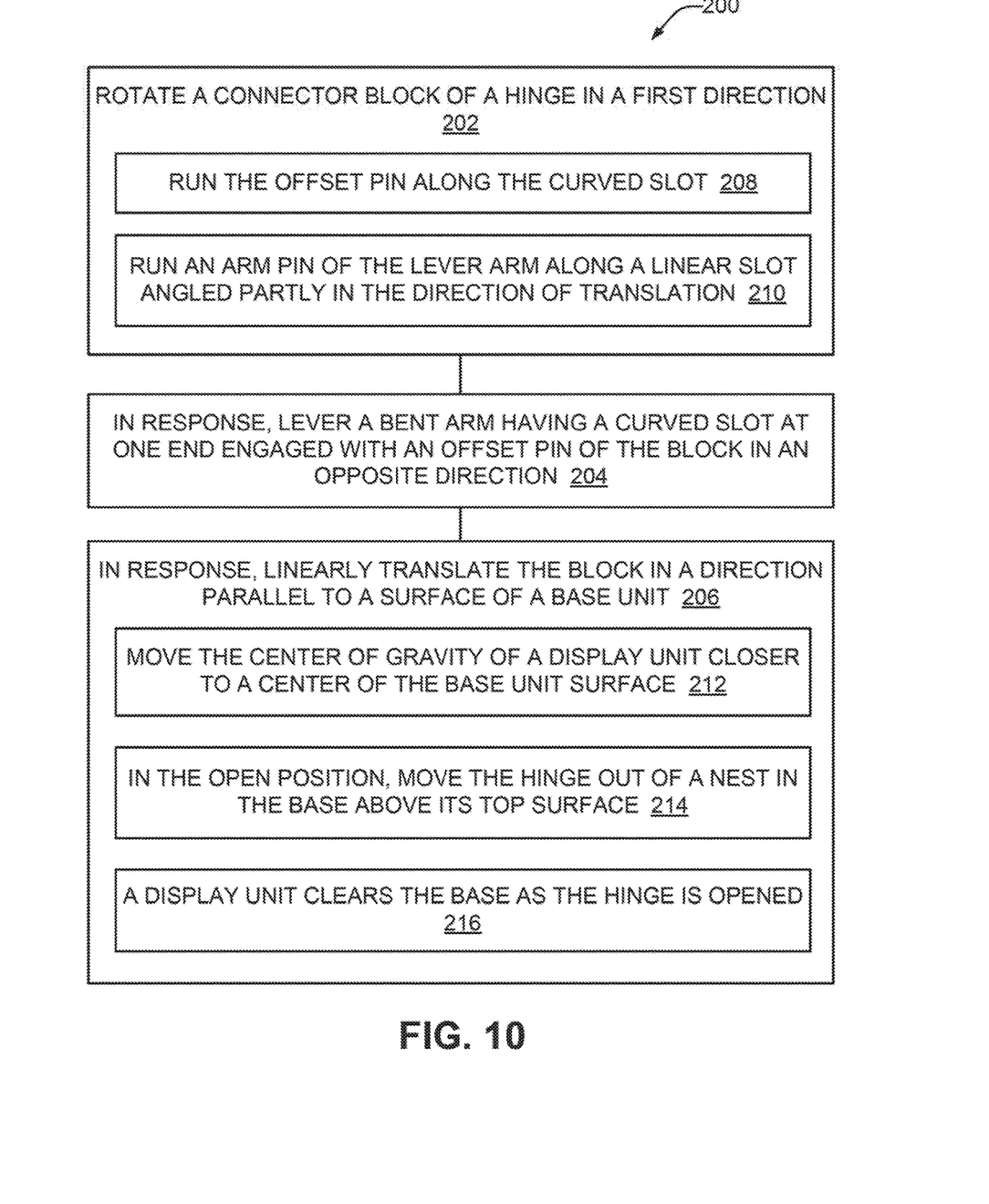
FIG. 10 is a flowchart in accordance with an example of the present disclosure of a method of setting an electronic device from a closed orientation into an open orientation.

Consider now, with reference to FIG. 10, a flowchart of the operation of a double-track guided hinge mechanism. Alternatively, the flowchart of FIG. 10 may be considered as steps in a method 200 of operating a double-track guided hinge 40 in a base unit 20 of an electronic device 10. The method 200 begins at 202 by rotating a connector block 90 of the hinge 40 in a first direction 110. At 204, responsive to the rotating, a bent lever arm 80 of the hinge 40 is levered (i.e. rotated) in a second, opposite direction 118. The lever arm 80 has a curved slot 84 at one end that is engaged with an offset pin 92 of the block 90. At 206, responsive to the levering, the block 90 is linearly translated in a direction 124 parallel to a surface 22 and/or 28 of the base unit 20.

In some examples, the rotating 202 includes running the offset pin 92 along the curved slot 84 at 208 and running an arm 82 of the lever arm 80 along a linear slot 62 angled partially in the direction 124 of the linear translating at 210.

In some examples, the linear translating 206 includes, at 212, moving a center of gravity of a display unit 30 attached to the connector block 90 closer to a center of the surface 22 and/or 28 of the base unit 20. In some examples, the linear translating 206 also includes, at 214, moving the hinge 40 out of a nest 55 raised above a top surface 22 of the base unit 20 that houses the hinge 40 when the hinge 40 is in the closed position of FIGS. 7A-7B. In some examples, the linear translating 206 also allows, at 216, the rotated display unit 30 to clear the base unit 20 as the hinge 40 is placed from the closed position into the open position of FIGS. 9A-9B.

From the foregoing it will be appreciated that the double-track guided hinge, electronic device, notebook computer, and methods provided by the present disclosure represent a significant advance in the art. Although several specific examples have been described and illustrated, the disclosure is not limited to the specific methods, forms, or arrangements of parts so described and illustrated. For instance, examples of the hinge of the disclosure are not limited to use with electronic devices but can be used with other mechanical packages having a flip-up design. This description should be understood to include all novel and non-obvious combinations of elements described herein, and claims may be presented in this or a later application to any novel and non-obvious combination of these elements. Terms of orientation and relative position (such as "top," "bottom," "side,", "front", "rear" and the like) are not intended to require a particular orientation of any element or assembly, and are used only for convenience of illustration and description. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor including two or more such elements.

What is claimed is:

1. A double-track guided hinge for an electronic device, comprising:
   a bent lever arm having an arm pin adjacent one end, an arm pivot, and a curved slot adjacent the other end, the curved slot extending towards the arm pivot;
   an angled slot slidably engaged with the arm pin;
   a rotatable connector block having a block pivot and a pin radially offset from the block pivot, the offset pin slidably engaged with the curved slot; and
   a carrier moveably attached to the lever arm at the arm pivot and to the connector block at the block pivot, the carrier linearly moveable responsive to rotation of the pivot connector block.

2. The hinge of claim 1, wherein the first bracket is fixedly mounted in a base of the device, and wherein the block includes a protruding alignment tab complementary to a mating feature of a display unit.

3. The hinge of claim 1, comprising:
   a second bracket having two slots disposed linearly along an axis, wherein two pins of the carrier each engage one of the slots, and wherein the linear movement is in a direction along the axis.

4. The hinge of claim 3, wherein the first and second brackets are spaced apart and define a nest that houses the arm, the block, and the carrier when the block is rotated to a terminal position.

5. The hinge of claim 1, wherein the ends of the curved slot are disposed along a central axis of one leg of the bent arm, and the curved slot is bowed outward towards one side of the leg.

6. The hinge of claim 1, wherein the connector block comprises:
   a D-shaped pivot connector block having the offset pin; and
   a D-shaped docking connector block spaced apart from the pivot connector block and having the alignment tab, wherein the pivot connector block and the docking connector block are fixedly connected to each other and rotatably engaged with the carrier.

7. A notebook computer, comprising:
   a base having a top surface and a nest raised above the top surface by a distance;
   a display unit having a thickness substantially equal to the distance, the display unit positionable against the top surface and the nest in a closed orientation of the device to form a substantially continuous outer surface of the device; and
   a double-track guided hinge mechanism attached to the base and the display unit, the mechanism having a first position within the nest in the closed orientation and a second position outside, and displaced linearly along an axis substantially parallel to the top surface from, the nest when the display unit is rotated into an open orientation of the device.

8. The notebook computer of claim 7, wherein the base does not include a clearance out for the hinge mechanism.

9. The notebook computer of claim 7, comprising:
   an alignment tab mounted to the hinge mechanism, wherein the display unit is removably attached to the base via the alignment tab and a hating tab receptacle on the display unit.

10. The notebook outer of claim 7, wherein the hinge mechanism comprises:
    a bent lever arm having an arm pin adjacent one end, an arm pivot at a bend, and a curved slot adjacent the other end, the curved slot extending towards the arm pivot;
    a first bracket having an angled slot slidably engaged with the arm pin;
    a rotatable connector block having a block pivot and a pin radially offset from the block pivot, the offset pin slidably engaged with the curved slot; and
    a non-rotatable carrier attached to the lever arm at the arm pivot and to the connector block at the block pivot, the carrier linearly moveable responsive to rotation of the connector block.

11. A method of operating a double-track guided hinge in a base unit of an electronic device, comprising:
    rotating a connector block of the hinge in a first direction;
    responsive to the rotating, levering a bent lever arm of the hinge in a second, opposite direction, the lever arm having a curved slot at one end engaged with an offset pin of the block; and
    responsive to the levering, linearly translating the block in a direction parallel to a surface of the base unit.

12. The method of claim 11, wherein the rotating includes:
    running the offset pin along the carved slot, and
    running an arm pin of the lever arm along a partially in the direction of the linear translating.

13. The method of claim 11, wherein a display unit is attached to the connector block, and wherein the linear translating moves a center of gravity of the rotated display unit closer to a center of the surface of the base unit.

14. The method of claim 11, wherein the base unit includes a nest, raised above a to surface of the base unit, that houses the hinge in a closed position, and wherein the linear translating moves the hinge out of the nest in an open position.

15. The method of claim 11, wherein a display unit is attached to the connector block, and wherein the linear translating allows the rotated display unit to clear the base unit as the hinge is placed from a closed position into an open position.

* * * * *

UNITED STATES PATENT AND TRADEMARK OFFICE
CERTIFICATE OF CORRECTION

PATENT NO. : 9,696,765 B2  Page 1 of 1
APPLICATION NO. : 15/021433
DATED : July 4, 2017
INVENTOR(S) : Mark Senatori et al.

It is certified that error appears in the above-identified patent and that said Letters Patent is hereby corrected as shown below:

In the Claims

In Column 10, Line 12 approx., in Claim 9, delete "hating" and insert -- mating --, therefor.

In Column 10, Line 14 approx., in Claim 10, delete "outer" and insert -- computer --, therefor.

In Column 10, Line 38 approx., in Claim 12, delete "carved" and insert -- curved --, therefor.

In Column 10, Line 39 approx., in Claim 12, delete "a partially" and insert -- a linear slot angled partially --, therefor.

In Column 10, Line 46 approx., in Claim 14, delete "to" and insert -- top --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*